H. A. BULIŘ.
TELESCOPIC LAMP AND LIKE SUPPORT.
APPLICATION FILED SEPT. 23, 1912.
1,058,217.
Patented Apr. 8, 1913.
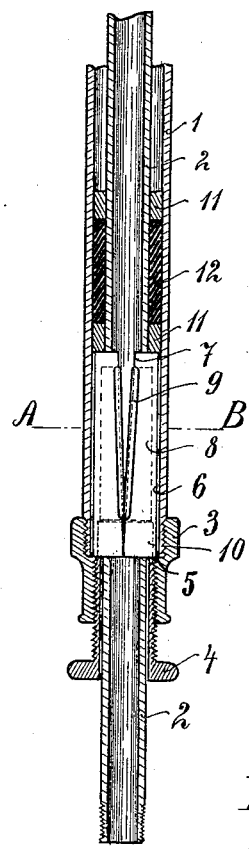
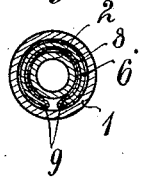
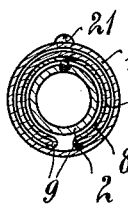
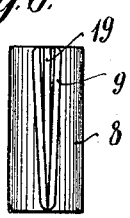
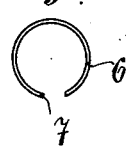
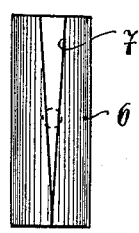
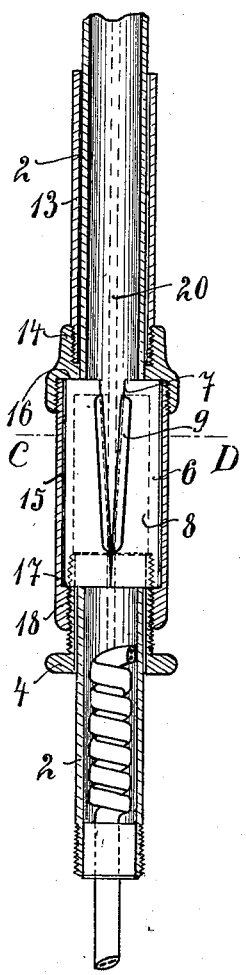
Witnesses.
Carl Wenzel
Hugo von Falkenhayn
Inventor.
Hermann Anton Buliř

UNITED STATES PATENT OFFICE.

HERMANN ANTON BULIŘ, OF BERLIN-NEUKÖLLN, GERMANY.

TELESCOPIC LAMP AND LIKE SUPPORT.

1,058,217.   Specification of Letters Patent.   Patented Apr. 8, 1913.

Application filed September 23, 1912. Serial No. 721,964.

*To all whom it may concern:*

Be it known that I, HERMANN ANTON BULIŘ, a subject of the Emperor of Austria-Hungary, and residing at Berlin-Neukölln, Germany, have invented certain new and useful Improvements in Telescopic Lamp and Like Supports, of which the following is a specification.

The present invention relates to a lamp support of the kind composed of telescopically adjustable parts, and consists in the provision of two concentric sleeves arranged between the telescopic elements and supported on the outer one. Both sleeves are split throughout their length so as to form an upwardly flaring gap, and the edges formed by the gap of the inner sleeve are lapped over and guided on the edges of the outer sleeve. The inner sleeve is in frictional engagement with the inner telescopic element and is capable of slight axial movement relative to the outer sleeve. Participating in the downward movement of the inner telescopic element, the inner sleeve is contracted by the converging edges of the outer sleeve and clamped to the element so as to arrest the same in its movement.

Means are provided for limiting the contraction of the sleeve so as to be only just enough for supporting the lamp whereas by increased pressure, applied for instance by the hand, the support can be adjusted as desired.

In the case of gas brackets held by telescopic gas pipes a packing is inserted between the pipes above the sleeves and held by two split resilient rings, the latter being clamped to the outer pipe.

In the accompanying drawings the invention is illustrated in connection with supports for gas as well as for electric lamps, Figure 1 representing a longitudinal section of the gas lamp support, Fig. 2 a plan of one of the rings controlling the packing, Fig. 3 a cross-section on the line A—B of Fig. 1, Fig. 4 a plan of a supporting ring for the inner sleeve, Fig. 5 an end view of the inner sleeve, Fig. 6 a front view of the same, Fig. 7 a longitudinal section of the support for the electric lamps, Fig. 8 a cross-section on the line C—D of Fig. 7, Fig. 9 an end view of the outer sleeve, and Fig. 10 a front view of the same.

The lamp is suspended on the pipe 2 which telescopes within a pipe 1, the latter being in Fig. 1 supposed to consist of a gas supply pipe. On the lower end of the pipe 1 is secured a socket 3 which has an internal shoulder 5 for the support of a sleeve 6. The latter encircles a sleeve 8, and both are arranged within the pipe 1 and about the pipe 2. Both sleeves are split throughout their length so as to form an upwardly flaring gap, and the edges 9 of the inner sleeve are lapped over the edges 7 of the outer sleeve so as to be guided on the latter. Being in frictional engagement with the pipe 2, the sleeve 8 tends to participate in its downward movement and is, in so doing, contracted by the converging edges 7 of the sleeve 6. Owing to its contraction, the sleeve 8 clamps the pipe 2 and arrests the latter in its movement.

An adjusting sleeve 4 with milled head is screwed into the socket 3 so as to support the sleeve 8 and limit its downward movement. By means of this adjusting sleeve the contraction of the sleeve 8 can be modified so that, while it is sufficient for securing the pipe 2 against the weight of the lamp, a downward adjustment of the latter can easily be effected by a pressure with the hand. When the pipe 2 is moved upward the sleeve 8 is naturally expanded and the pipe released.

In order to reduce the shock incurred when the pipe 2 is arrested by the sleeve 8, a ring 10 of leather, felt or the like is preferably inserted between said sleeve and the adjusting sleeve 4 as shown in Fig. 1.

A packing 12 is arranged above the sleeves between the pipes 1 and 2 and between two split clamp rings 11. The latter are clamped to the pipe 1 and the lower ring serves simultaneously to hold the sleeve 6 in position against the shoulder 5. A flange is provided on the upper end of the pipe 2, in known manner, so as to prevent, by abutment against the upper ring 11, the pipe from being entirely withdrawn. The packing 12 may be of considerable length and therefore capable, without being highly compressed, of making the joint gas-tight. An adjustment of the upper ring 11, for compressing the packing whenever required, can easily be effected by means of the flange of the pipe 2, the latter being for that purpose drawn out to its full extent.

For electric lamps the arrangement is modified as shown in Fig. 7, since no packing is required. In this case the sleeves 6 and 8 are inclosed within a cylindrical casing 15 which is screwed against a shoulder 16 into a socket 14, the latter being screwed upon the end of the outer pipe 13. A shoulder 17 is formed at the lower end of the casing 15 for the support of the sleeve 6. The adjusting sleeve 4 is screwed into the lower end 18 of the casing. In other respects the construction and action of the device are identical with Fig. 1.

To prevent the pipe 2 from turning, the sleeve 8 is provided internally with a longitudinal rib 19 which engages a corresponding groove 20 made in the pipe 2. The casing 6 can be secured to the casing 15 by means of a set-screw 21.

The device being exceedingly simple, it can be easily applied to any existing lamp which can thus be conveniently adjusted without the employment of the cumbersome and heavy weights and pulleys. By careful adjustment of the clamping elements, the up and down movements of the lamp can be brought entirely without shocks and therefore without injury to mantles, filaments, glass-shades and the like.

I claim:—

1. In a telescopic lamp and like support, two concentric sleeves arranged between the telescopic elements and supported on the outer one, both sleeves being split throughout their length so as to form an upwardly flaring gap, the inner sleeve being in frictional engagement with the inner telescopic element and adapted to slide a short distance together with the latter, the margins at the gap of the inner sleeve being lapped over the converging edges of the outer sleeve so that said inner sleeve is contracted and clamped to the inner telescopic element for arresting the movement of the same when slid downward under the influence of its weight, substantially as and for the purpose set forth.

2. In a telescopic lamp and like support, two concentric sleeves arranged between the telescopic elements and supported by the outer one, both sleeves being split throughout their length so as to form an upwardly flaring gap, the inner sleeve being in frictional engagement with the inner telescopic element and adapted to slide a short distance together with the latter, the margins at the gap of the inner sleeve being lapped over the converging edges of the outer sleeve so that said inner sleeve is contracted and clamped to the inner telescopic element for arresting the movement of the same when slid downward under the influence of its weight, and a screw-threaded ring secured to the outer telescopic element so as to limit the downward movement of the inner sleeve and allow the contraction of the same to be modified, substantially as set forth.

3. In a telescopic lamp and like support, two concentric sleeves arranged between the telescopic elements and supported by the outer one, both sleeves being split throughout their length so as to form an upwardly flaring gap, the inner sleeve being in frictional engagement with the inner telescopic element and adapted to slide a short distance together with the latter, the margins at the gap of the inner sleeve being lapped over the converging edges of the outer sleeve so that said inner sleeve is contracted and clamped to the inner telescopic element for arresting the movement of the same when slid downward under the influence of its weight, means for limiting the movement of the inner sleeve and modifying its contraction, a set-screw for securing the outer sleeve against rotary movement, and a longitudinal rib at the inside of the inner sleeve adapted to take into a corresponding groove in the inner telescopic element so as to hold the latter against rotary movement, substantially as set forth.

4. In a telescopic gas lamp support, the combination with two telescopic gas pipes, of two concentric sleeves arranged between said pipes and supported on the outer one, both sleeves being split throughout their length so as to form an upwardly flaring gap, the inner sleeve being in frictional engagement with the inner pipe and adapted to slide a short distance together with the latter, the margins at the gap of the inner sleeve being lapped over the converging edges of the outer sleeve so that said inner sleeve is contracted and clamped to the inner pipe for arresting the movement of the same when slid downward under the influence of the weight of the lamp, means for limiting the movement and modifying the construction of the inner sleeve, a packing arranged between the pipes above the sleeves, and two split resilient rings clamped to the inside of the outer pipe at opposite sides of said packing so as to hold the latter compressed, substantially as set forth.

HERMANN ANTON BULIŘ.

Witnesses:
WOLDEMAR HAUPT,
HENRY HASPER.

Copies of this patent may be obtained for five cents each, by addressing the "Commissioner of Patents, Washington, D. C."